United States Patent
Wallerstein et al.

(10) Patent No.: US 6,388,820 B1
(45) Date of Patent: May 14, 2002

(54) PANORAMIC IMAGING ARRANGEMENT

(75) Inventors: Edward P. Wallerstein, Pleasanton; Edward C. Driscoll, Jr., Portola Valley; Willard C. Lomax, Sunnyvale; James E. Parris, Pacifica; John L. Furlani, Palo Alto; Edward V. Bacho, Sunnyvale; Jorge E. Carbo, Jr., Los Altos, all of CA (US)

(73) Assignee: Be Here Corporation, Cupertino, CA (US)

( * ) Notice: Subject to any disclaimer, the term of this patent is extended or adjusted under 35 U.S.C. 154(b) by 0 days.

(21) Appl. No.: 09/999,282

(22) Filed: Nov. 26, 2001

Related U.S. Application Data

(60) Division of application No. 09/137,660, filed on Aug. 20, 1998, which is a continuation-in-part of application No. 08/872,525, filed on Jun. 11, 1997.
(60) Provisional application No. 60/020,292, filed on Jun. 24, 1996.

(51) Int. Cl.$^7$ .......................... G02B 13/06; G02B 17/00
(52) U.S. Cl. ......................................... 359/725; 359/727
(58) Field of Search .................................. 359/725, 727

(56) References Cited

U.S. PATENT DOCUMENTS

| | | | | |
|---|---|---|---|---|
| 3,170,025 A | * | 2/1965 | Ino ............................. | 359/725 |
| 3,229,576 A | * | 1/1966 | Ree ............................. | 359/364 |
| 5,473,474 A | * | 12/1995 | Powell ........................ | 359/725 |
| 6,175,454 B1 | * | 1/2001 | Hoogland et al. .......... | 359/725 |
| 6,222,683 B1 | * | 4/2001 | Hoogland et al. .......... | 359/725 |
| 6,313,865 B1 | * | 11/2001 | Driscoll, Jr. et al. .......... | 348/36 |
| 6,341,044 B1 | * | 1/2002 | Driscoll, Jr. et al. ........ | 359/725 |
| 2001/0010555 A1 | * | 8/2001 | Driscoll, Jr. ................ | 348/335 |
| 2002/0012059 A1 | * | 1/2002 | Wallerstein et al. ........ | 348/335 |

FOREIGN PATENT DOCUMENTS

WO WO 00/11512 * 2/2000 ........... G02B/27/10

* cited by examiner

Primary Examiner—Georgia Epps
Assistant Examiner—David N. Spector
(74) Attorney, Agent, or Firm—Daniel B. Curtis; Dag H. Johansen

(57) ABSTRACT

According to one aspect the invention, a panoramic imaging arrangement is provided which includes at least a first lens block including a convex reflective surface and a transparent component. The convex reflective surface has a substantially vertically extending axis of revolution and is capable of receiving light from a 360° surrounding panoramic scene, and reflecting the light for further manipulation. The transparent component covers the convex reflective surface. The convex reflective surface is thereby protected from environmental conditions which may otherwise result in damage to the convex reflective surface.

3 Claims, 2 Drawing Sheets

PANORAMIC IMAGING ARRANGEMENT

This patent application is a divisional of copending U.S. patent application Ser. No. 09/137,660 filed Aug. 20, 1998 which is a is a continuation-in-part of copending U.S. patent application Ser. No. 08/872,525 filed Jun. 11, 1997 which claims priority from U.S. Provisional Patent Application Ser. No. 60/020,292 filed Jun. 24, 1996.

BACKGROUND OF THE INVENTION

1). Field of the Invention

This invention relates to a panoramic imaging arrangement of the kind capable of capturing, focusing, correcting aberrations and otherwise manipulating light received from a 360° surrounding panoramic scene, and to a method of capturing a 360° surrounding panoramic scene.

2). Discussion of Related Art

Panoramic imaging arrangements have become popular in recent years for purposes of viewing 360° surrounding panoramic scenes. Older generations of panoramic imaging arrangements generally consisted of revolving periscope-like constructions having relatively complex mechanisms for revolving them. More recently, stationary panoramic imaging arrangements have been developed. A stationary panoramic imaging arrangement generally has one or more lenses, each having a vertically extending axis of revolution, which are used to refract or reflect light received from a 360° surrounding panoramic scene. The lenses alter the direction of the light, whereafter the light passes through a series of lenses which are located vertically one above the other and which further manipulate the light by, for example, focusing the light or altering the intensity of the light.

The task of receiving light in a sideways direction and altering the direction of the light so that the light then proceeds in a vertical direction is a difficult one. Altering the direction of light to such a degree, especially when coming from a 360° surrounding scene, oftentimes leads to aberrations in the resulting light. These aberrations may include astigmatism of the light, defects in color of the light, a loss of image plane flatness, and other defects, some of which are discussed in more detail herein below.

Relatively complex lenses and lens arrangements have been developed in order to overcome these aberrations. Some of these lenses have surfaces which are aspherical (see for example U.S. Pat. No. 5,473,474 issued to Powell). Aspherical lenses are difficult to manufacture and therefore less practical to manufacture than for example spherical lenses.

One reason why aberrations in light occur is due to the use of refractive lenses instead of reflective lenses. The use of refractive lenses results in aberrations in color of the resulting light, whereas the use of reflective, or mirror lenses does not result in, or cause minimal aberrations in color of the light reflected from them. One reason for the lack of the use of reflective lenses, on the other hand, is that reflective lenses, when exposed to the environment, degrade through time, resulting in loss of image.

These and other aberrations in light are more prominent when light is received from a panoramic view at a relatively large lateral included angle, particularly if the included angle, in a vertical plane, is larger than 90° and especially if the included angle extends from an angle below the horizon to an angle above the horizon, i.e. covering substantially more than a hemisphere.

SUMMARY OF THE INVENTION

According to one aspect of the invention, a panoramic imaging arrangement is provided comprising at least a first lens block including a convex reflective surface and a transparent lens. The convex reflective surface has a substantially vertical axis of revolution and is capable of receiving light from a 360° surrounding panoramic scene, and reflecting the light for further manipulation. The transparent lens has a convex outer surface and covers the convex reflective surface. The convex reflective surface is thereby protected from environmental conditions which may otherwise result in damage to the convex reflective surface. An additional advantage is that a convex cover introduces fewer aberrations and internal reflections.

The convex reflective surface may, for ease of fabrication, be substantially spherical.

The transparent component may, for ease of fabrication, have a spherical outer surface thorough which light from the panoramic scene passes before reaching the convex reflective surface.

The panoramic imaging arrangement may include a second lens block secured to the first lens block. Light, reflected by the convex reflective surface, may pass through the transparent component, whereafter the light may pass through the second lens block. The second lens block provides a way for the first lens block to be held without obscuring its field of view.

The convex reflective surface is preferably capable of receiving light for an unbroken included angle of at least 60° in a vertical plane, from the panoramic scene, and reflecting the light so as to pass through the second lens block.

The included angle preferably extends from an angle below the horizon to an angle above the horizon. The panoramic imaging arrangement is therefore capable of capturing more than just a hemispherical scene. The angle below the horizon is preferably at least 30° below the horizon and the angle above the horizon is preferably at least 30° above the horizon.

A transparent optical cement may be located between the first and second lens blocks and secure the first and second lens blocks to one another.

According to another aspect of the invention, a panoramic imaging arrangement is provided which includes at least a first lens block including a convex reflective surface and a transparent component. The convex reflective surface has a substantially vertical axis of revolution. The convex reflective surface is capable of receiving light from a 360° surrounding panoramic scene for an unbroken included angle, in a vertical plane extending from an angle below the horizon to an angle above the horizon. The convex reflective surface is capable of reflecting the light for further manipulation. The transparent component covers the reflective surface.

According to a further aspect of the invention, a panoramic imaging arrangement is provided comprising at least one lens having a substantially vertical axis of revolution and a convex spherical reflective surface capable of receiving light from a 360° surrounding panoramic scene and reflecting the light received from the panoramic scene. Reflective surfaces cause less aberrations in color, convex reflective lenses require less power, and spherical lenses are easier to manufacture.

Apparatus is preferably provided which is positioned to receive light reflected by the convex spherical reflective surface and is capable of correcting at least one aberration of the light.

The apparatus preferably manipulates the light so as to correct astigmatism, so as to do color correction, to focus the light, to adjust f-theta closer to a desired level, or so as to create a flat image plane when the light is focused.

The convex spherical reflective surface is preferably capable of receiving light for an unbroken included angle of at least 60°, in a vertical plane, whereafter the light from the entire included angle is received by the manipulation apparatus.

The included angle preferably extends from an angle below the horizon to an angle above the horizon.

According to a further aspect of the invention, a panoramic imaging arrangement is provided comprising at least one lens, and light manipulation apparatus. The lens has a substantially vertical axis of revolution. The lens is also capable of receiving light from a 360° panoramic scene surrounding the lens for an unbroken included angle of at least 60°, in a vertical plane, extending from an angle below the horizon to an angle above the horizon. The lens is further capable of altering the direction of the light received from the panoramic scene. The light manipulation apparatus is positioned and capable of receiving light from the lens for the entire included angle. One advantage of such a lens is that a relatively large included angle, extending from below to above the horizon, can be viewed.

The lens preferably has a spherical surface altering the direction of the light.

The lens may have a reflective surface which reflects the light. The reflective surface may be convex and is preferably spherical.

According to yet a further aspect of the invention, apparatus is provided for capturing a panoramic scene. The apparatus comprises a vertical support structure, lower and upper lens blocks, and a convex reflective surface. The lower lens block is secured to an upper end of the support structure. The upper lens block is secured to the lower lens block in a position above the lower lens block and has a convex outer surface having a substantially vertical axis of revolution. The convex reflective surface is located on the upper lens block. Light from a 360° surrounding panoramic scene is capable of passing through the convex outer surface of the upper lens block into the upper lens block, the light is then reflected off the convex reflective surface, and the light then passes through the upper lens block and then through the lower lens block. In such an apparatus there is little obscuring of the panoramic view by the support structure.

The apparatus for capturing the panoramic scene preferably includes a system of lenses positioned below the lower lens block to receive light after passing through the lower lens block.

According to yet a further aspect of the invention, a method is provided of mounting a panoramic lens arrangement including a first lens block which includes a convex reflective surface having a substantially vertical axis of revolution, and a transparent component covering the reflective surface, and a second lens block located on the first lens block. The method includes the step of securing the second lens block to a support structure in a position so that light from a 360° surrounding panoramic scene passes through the transparent component, whereafter the light is reflected by the convex reflective surface, whereafter the light passes through the second block.

According to yet a further aspect of the invention, a method of capturing a panoramic scene is provided. Light, received from a 360° panoramic scene surrounding a convex spherical reflective surface, is reflected from the convex spherical reflective surface. The light reflected from the convex spherical reflective surface may then be corrected for at least one characteristic of the light, the characteristic being selected from the group consisting of: astigmatism; color; f-theta and image flatness.

The convex spherical reflective surface preferably receives light for an unbroken included angle of at least 60°, in a vertical plane, whereafter the light from the entire included angle is corrected.

The included angle preferably extends from an angle below the horizon to an angle above the horizon.

According to yet a further aspect of the invention another method of capturing a panoramic scene is provided. Light is received from a 360° surrounding panoramic scene for an unbroken included angle of at least 60° extending from an angle below the horizon to an angle above the horizon. The direction of the light received from the panoramic scene is then altered. After the direction of the light is altered, at least one characteristic of the light is corrected, the characteristic being selected from the group consisting of: astigmatism; color; f-theta; and image flatness.

BRIEF DESCRIPTION OF THE DRAWINGS

The invention is further described by way of example with reference to the accompanying drawings wherein.

DESCRIPTION OF PREFERRED EMBODIMENT

Figure 1:
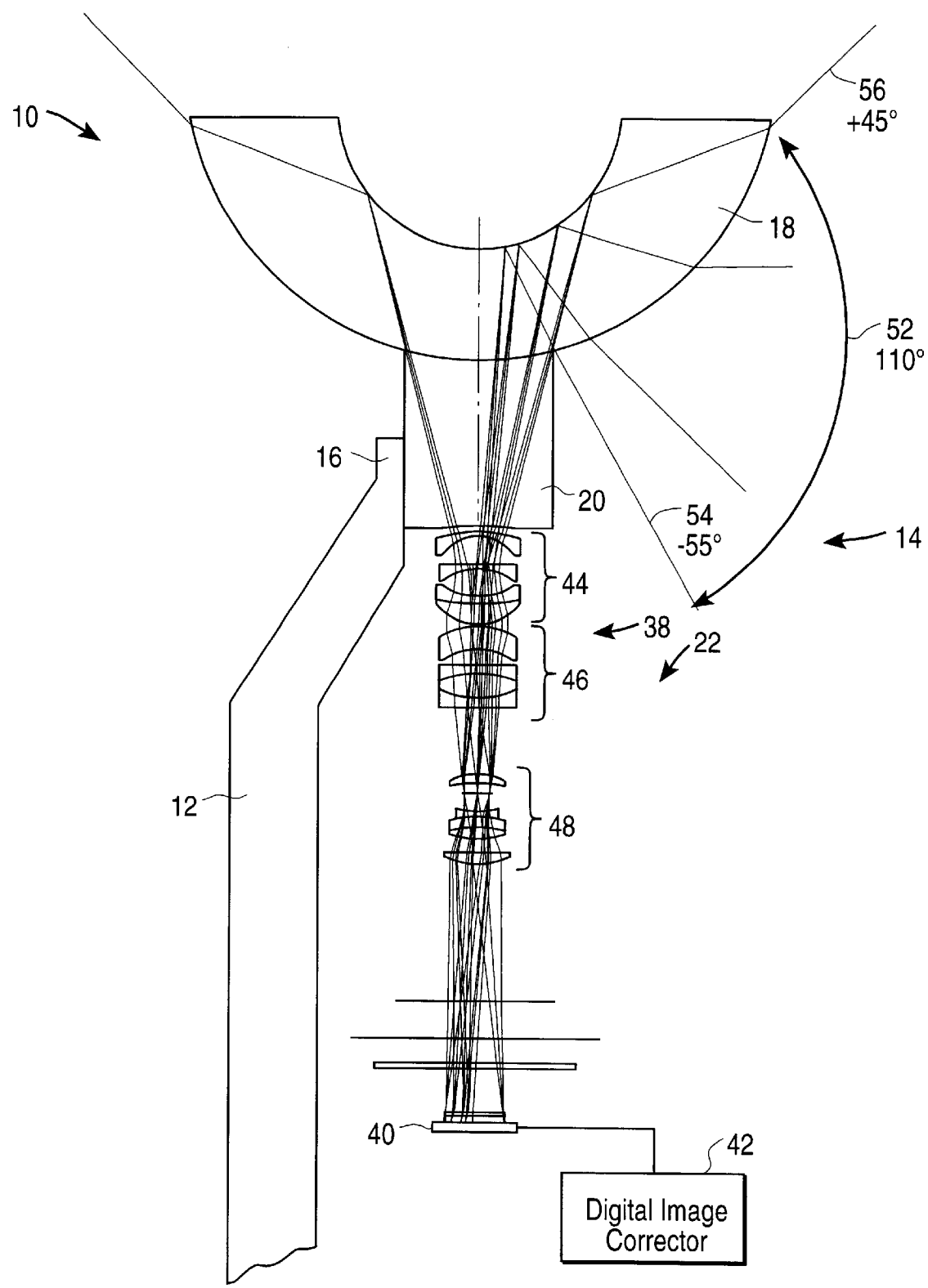
FIG. 1 is a side view illustrating apparatus, according to an embodiment of the invention, for viewing in a panoramic scene.

FIG. 1 of the accompanying drawings illustrates apparatus 10, according to an embodiment of the invention, for capturing a panoramic scene. The apparatus 10 includes a vertically extending support structure 12, and a panoramic imaging arrangement 14 which is secured to an upper end 16 of the support structure 12.

The support structure 12 may be any device having an upper end 16 which is high enough for purposes of providing a viewpoint of a panoramic scene. The support structure 12 may, for example, be a vertically extending post, a tripod stand, or may form part of building structure.

The panoramic imaging arrangement 14 includes a first, upper lens block 18, a second, lower lens block 20, and apparatus 22, positioned below the second lens block 20, for manipulating light so as to correct certain aberrations of the light and to focus the light (hereinafter generally referred to as the "light manipulation apparatus 22").

Figure 2:
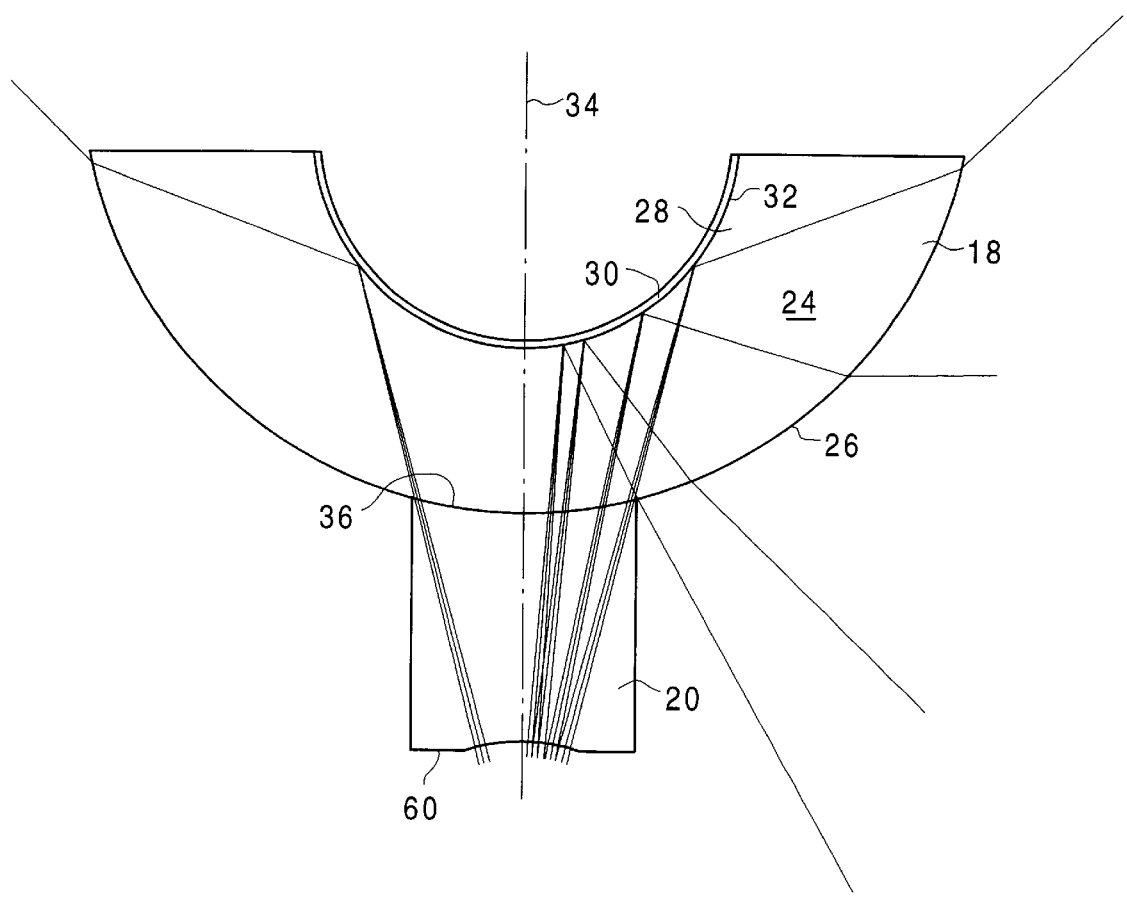
FIG. 2 is an enlarged view of first and second lens blocks forming part of the apparatus of FIG. 1.

FIG. 2 is an enlarged view of the first and second lens blocks 18 and 20.

The first lens block 18 includes a transparent component or refractive lens 24 which has a substantially spherical convex outer and lower surface 26, and a substantially spherical concave inner and upper surface 28. Center points of the convex outer surface 26 and the concave inner surface 28 of the transparent lens 24 substantially coincide with one another.

The concave inner surface 28 is covered with a thin layer of reflective material 30. After the reflective material 30 is deposited, a substantially spherical convex reflective surface 32 (sometimes generally referred to herein as a "convex reflective lens") is provided against the transparent lens 24. The transparent lens 24 so covers the convex reflective surface 32, thereby providing a shield protecting the convex reflective surface 32 against environmental conditions which may otherwise cause damage to the convex reflective surface 32.

The convex outer surface 26 of the transparent lens 24 and the convex reflective surface 32 have a common, substantially vertical axis of revolution 34. The second lens block 20 is made out of cylindrical transparent material. An upper end 36 of the second lens block 20 has a substantially spherical concave surface which conforms with the convex outer surface 26 of the transparent lens 24.

The transparent lens 24 and the second lens block 20 are secured to one another be means of a transparent optical cement (not shown) which is located between the upper end 36 of the second lens block 20 and the convex outer surface 26 of the transparent lens 24. Transparent optical cements of the above kind are known in the art.

Referring again to FIG. 1, the light manipulation apparatus 22 includes a system of lenses 38, image capturing apparatus 40, and digital image corrector 42.

The system of lenses 38 includes a first set of lenses 44, a second set of lenses 46, and a third set of lenses 48. The lenses work together to correct aberrations of light. Generally speaking the first set of lenses 44 is designed and configured to reduce astigmatism, the second set of lenses 46 for doing color correction, and the third set lenses 48 for creating an image of suitable scale and for fine-tuning certain other system aberration as will further be discussed herein. One skilled in the art of optics will appreciate that the respective sets of lenses 44, 46, and 48 are of conventional kind although their collective effect may be unique in completing the present embodiment. Further details of such lenses may be found in a handbook on modern optics such as in "Modern Optical Engineering" by Warren J. Smith (McGraw Hill, Inc.; 1990).

The panoramic imaging arrangement 14 is secured to the upper end 16 of the support structure 12 by mounting the second lens block 20 directly to the upper end 16 of the support structure 12. No metal or other components are therefore secured to the first lens block 18.

In use, light is received laterally from a 360° panoramic scene surrounding the first lens block 18 (see FIG. 2). Light from the panoramic scene enters the convex outer surface 26 of the transparent lens 24 of the first lens block 18 for an unbroken and continuous included angle 52 located in a vertical plane. The included angle is about 105° covering more than a hemisphere and extends from an angle 54 which is about 55° below the horizon to an angle 56 which about 40° above the horizon. (The included angle 52 is therefore at least 60° and preferably at least 90°, and the angles 54 and 56 below and above the horizon are each therefore at least 30° below and above the horizon.)

It should be noted that the lens blocks 18 and 20 are mounted to the support structure 12 so that light from the panoramic scene is capable of passing over the upper end 16 of the support structure 12, i.e., without the support structure obscuring light from the panoramic scene.

Light from the panoramic scene is refracted slightly upwardly when entering the transparent lens 24. The light then travels through the transparent lens 24 and is reflected downwardly from the convex reflective surface 32. The light then passes downwardly through the transparent lens 24 and exits the transparent lens 24 downwardly through the convex outer surface 26.

The light then passes through the transparent optical cement located between the first and second lens blocks 18 and 20, whereafter the light enters the second lens block 20 through the upper end 36 thereof. The second lens block 20 has a diameter which is sufficiently wide so that light from the entire included angle 52, after being reflected by the convex reflective surface 32, enters the second lens block 20 thorough its upper end 36. The light then travels through the second lens block 20 and exits the second lens block through a lower end 60 thereof. Although not shown in particular detail in the figures, the cylindrical outer surface of the second lens block 20 is typically covered to prevent light from entering into the second lens block 20 in a sideways direction. This may be accomplished with the upper end 16 of the support structure shown in FIG. 2.

Should an attempt be made to focus the light after leaving the second lens block 20, certain aberrations would be noticed. These aberrations include astigmatism, abnormality in color, lack of image plane flatness, and a value of f-theta which is less than 1. The value f-theta is indicative of how much compression of view occurs in a vertical direction of an image view, resulting in more vertical compression in one area of the image view than in another area of the image view. Values of f-theta are expressed as fractions of 1 so that a value of f-theta approaching 1 would be indicative of more uniform compression, and a value of f-theta which is a smaller fraction of 1 would be indicative of more non-uniform compression.

A number of factors, alone and in combination, contribute to these aberrations, including the relatively large width of the included angle 52, the relatively large inclination of the angle 54 below the horizon, the relatively high inclination of the angle 56 above the horizon, and the particular choice of lenses, including the choice of a substantially spherical convex outer surface 26 of the transparent lens 24, and the substantially spherical convex reflective surface 32. These aberrations occur even though a reflective surface 32 is used which causes less aberrations in color than a refractive surface would and even though the transparent lens 24 has a convex outer surface 26 which assists greatly in reducing aberrations.

The light manipulation apparatus 22 (see FIG. 1), however, functions to correct or at least to reduce these aberrations.

In particular, the first set of lenses 44 is positioned so that light from the second lens block 20 passes through the first set of lenses 44. The first set of lenses 44 then generally corrects or at least reduces astigmatism of the light to an acceptable level.

The second set of lenses 46 is positioned to receive the light, after passing through the first set of lenses 44, and generally functions so as to do color correction of the light.

The third set of lenses 48 is positioned to receive light, after passing through the second set of lenses 46, and generally functions to reduce the effect of compression so that the value f-theta is adjusted closer to 1, typically to a value above 0.5. The third set of lenses 48 also functions to flatten the image plane and focus the image on the image capturing apparatus 40.

The image capturing apparatus 40 may, for example, be a digital detection array capable of capturing the image projected by the panoramic imaging arrangement 14. Certain aberrations may still exist, even after the light passes through the system of lenses 38. For example, the value of f-theta, although adjusted to be closer to 1, may still be somewhat below 1.

The digital image corrector 42 is coupled to the image capturing apparatus so as to receive the image captured by the image capturing apparatus 40. The digital image corrector 42 is capable of adjusting the image so as to correct for certain, still existing aberrations. For example, the digital image corrector 42 may adjust f-theta so as to be closer or substantially equal to 1. One skilled in the art would appreciate that the digital image corrector 42 typically has a processor and memory with an executable program which corrects the aberrations in the light referred to.

As mentioned previously, one unique feature is that a substantially spherical convex reflective surface 32 is used which is protected from environmental conditions which may otherwise result in damage to the reflective surface 32. Reflective lenses generally have the advantage that they reflect light with little or no aberrations in color of the reflected light and convex reflective lenses have the added advantage that they require less power than, for example, concave reflective lenses.

It should also be evident from the aforegoing description that another advantage is that the panoramic imaging arrangement 14 can be mounted to the support structure 12 in a manner wherein the support structure 12 does not obscure light from a panoramic view from reaching the first lens block 18.

A further advantage of the invention is that lenses having substantially spherical surfaces are used. Spherical surfaces are easier to manufacture than paraboloidal, hyperboloidal, ellipsoidal or other aspheric surfaces and are therefore less expensive to manufacture.

Yet a further advantage is that a relatively large included angle 52 can be received which extends from a relatively large angle 54 below the horizon to a relatively large angle 56 above the horizon.

Although spherical surfaces are used, at least one of which having a reflective surface, and regardless of the choice of angles 52, 54, and 56, a final image is created which is corrected for astigmatism and color, which is flattened, and in which the value of f-theta is controlled.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed is:

1. Apparatus for capturing a panoramic scene, the apparatus comprising:

a vertically extending support structure;

a lower lens block secured to an upper end of the support structure;

an upper lens block secured to the lower lens block in a position above the lower lens block, the upper lens block having convex, outer surface having a vertically extending axis of revolution;

a convex reflective surface on the upper lens block wherein light from a substantially 360° surrounding panoramic scene passes through the convex outer surface of the upper lens block into the upper lens block, the light is then reflected off the convex reflective surface, and the light then passes through the upper lens block and then through the lower lens block.

2. The apparatus of claim 1 that includes a system of lenses, positioned below the lower lens block to receive the light after passing through the lower lens block.

3. A method of mounting a panoramic lens arrangement which includes a first lens block including a convex reflective surface having a vertically extending axis of revolution, a transparent component covering the reflective surface, and a second lens block located on the first lens block, the method comprising:

securing the second lens block to a support structure in a position so that light from a substantially 360° surrounding panoramic scene passes through the transparent component, whereafter the light is reflected by the convex reflective surface, whereafter the light passes through the second lens block.

* * * * *